(12) United States Patent
Nakamura

(10) Patent No.: US 11,702,037 B2
(45) Date of Patent: Jul. 18, 2023

(54) MOTOR DEVICE

(71) Applicant: MITSUBA Corporation, Gunma (JP)

(72) Inventor: Osamu Nakamura, Gunma (JP)

(73) Assignee: MITSUBA Corporation, Gunma (JP)

( * ) Notice: Subject to any disclaimer, the term of this patent is extended or adjusted under 35 U.S.C. 154(b) by 353 days.

(21) Appl. No.: 16/644,166

(22) PCT Filed: Oct. 23, 2018

(86) PCT No.: PCT/JP2018/039360
§ 371 (c)(1),
(2) Date: Mar. 4, 2020

(87) PCT Pub. No.: WO2019/107018
PCT Pub. Date: Jun. 6, 2019

(65) Prior Publication Data
US 2021/0061230 A1 Mar. 4, 2021

(30) Foreign Application Priority Data
Nov. 29, 2017 (JP) ................ 2017-228650

(51) Int. Cl.
B60S 1/26 (2006.01)
F16H 1/16 (2006.01)
(Continued)

(52) U.S. Cl.
CPC ............... B60S 1/26 (2013.01); F16H 1/16 (2013.01); F16H 57/039 (2013.01); F16H 2057/02034 (2013.01)

(58) Field of Classification Search
CPC .... B60S 1/3479; B60S 1/3493; B60S 1/3495; B60S 1/0822; H02K 7/14; H02K 21/14;
(Continued)

(56) References Cited

FOREIGN PATENT DOCUMENTS

| CN | 101944797 | 1/2011 |
|---|---|---|
| CN | 102474160 | 5/2012 |

(Continued)

OTHER PUBLICATIONS

"Search Report of Europe Counterpart Application", dated Jul. 30, 2021, p. 1-p. 12.
(Continued)

Primary Examiner — Katina N. Henson
(74) Attorney, Agent, or Firm — JCIPRNET

(57) ABSTRACT

Motor device includes: motor part including armature shaft; speed reduction mechanism which includes worm and worm wheel and outputs the rotation of the armature shaft at reduced speed; gear case which is provided with bottom part and opening part and accommodates the worm and worm wheel in rotatable manner; gear cover which covers the opening part of the gear case; circuit board which is arranged between the speed reduction mechanism and the gear cover; and board cover which is arranged between the circuit board and the speed reduction mechanism. The board cover is provided with positioning protrusion part protruding toward the gear case, the gear case is provided with positioning recess part into which the positioning protrusion part is press-fit, and the bottom surface of the positioning recess part and the tip surface of the positioning protrusion part press-fit into the positioning recess part face each other with gap therebetween.

8 Claims, 8 Drawing Sheets

(51) Int. Cl.
*F16H 57/039* (2012.01)
*F16H 57/02* (2012.01)

(58) Field of Classification Search
CPC ...... H02P 1/04; H02P 6/08; H02P 6/00; H02P 23/00; H02P 27/00
USPC ............... 15/250.003, 250.3, 250.12; 310/66
See application file for complete search history.

(56) References Cited

FOREIGN PATENT DOCUMENTS

| | | | |
|---|---|---|---|
| CN | 103780014 | | 5/2014 |
| DE | 102015210648 | | 12/2016 |
| EP | 3220519 | | 9/2017 |
| JP | 2000188052 A | * | 7/2000 |
| JP | 2011234453 | | 11/2011 |
| JP | 2014087139 | | 5/2014 |
| JP | 2017017108 | | 1/2017 |
| JP | 2017046584 | | 3/2017 |
| WO | WO-2016010023 A1 | * | 1/2016 ............... B60S 1/08 |

OTHER PUBLICATIONS

"International Search Report (Form PCT/ISA/210) of PCT/JP2018/039360," dated Feb. 5, 2019, with English translation thereof, pp. 1-4.
Office Action of China Counterpart Application, with English translation thereof, dated Sep. 3, 2021, pp. 1-14.

* cited by examiner

MOTOR DEVICE

BACKGROUND OF THE INVENTION

1. Field of the Invention

The invention relates to a motor device including a speed reduction mechanism reducing the speed of the rotation of a motor and a control circuit controlling the motor.

2. Description of Related Art

A small size and a high output are required for driving sources of various devices mounted in vehicles such as automobiles. A wiper device is an example of the various devices mounted in vehicles, and a small size and a high output are also required for the driving source of the wiper device. Therefore, motor devices are used as the driving sources of many wiper devices. As an example of the motor device used as the driving source of a wiper device, it is known that the motor device has a motor and a speed reduction mechanism reducing the speed of the rotation of the motor. In such motor device, a rotational power with torque increased through speed reduction by the speed reduction mechanism is output to the outside via an output shaft.

In addition, as another example of the motor device used as the driving source of a wiper device, the motor device has a control circuit controlling the motor, in addition to the motor and the speed reduction mechanism. Normally, the control circuit is mounted on a circuit board and, for example, controls the speed, the rotation direction, etc., of the motor. The circuit board on which the control circuit is mounted is accommodated inside a housing together with gears, etc, that form the speed reduction mechanism. In such case, in order to prevent grease coated on gears, etc., from scattering and attaching to the circuit board, a cover (board cover) covering the circuit board may be arranged inside the housing.

PRIOR ART DOCUMENT(S)

Patent Document(s)

Patent Document 1: Japanese Laid-open No. 2011-234453

SUMMARY OF THE INVENTION

Issue(s) to be Solved by the Invention

The housing accommodating the speed reduction mechanism and the circuit board is formed by a gear cover and a gear case fixed in a state of abutting against each other. In such case, in order to fix the board cover disposed between the gear cover and the gear case, a plurality of protrusion parts or support parts abutting against the board cover are respectively disposed on the gear cover and the gear case.

However, in the fixing structure of the board cover, due to the variations of part size, the influences of the repulsive force of the seal material intervening between the gear cover and the gear case, etc., there are concerns that the board cover may not be accurately positioned, and rattles may occur. Meanwhile, when the board cover is strongly held to avoid rattles of the board cover, there are concerns that the board cover may be damaged.

The objective of the invention is to provide a motor device that positions the board cover accurately without rattles and without concerns that the board cover is damaged.

Means for Solving the Problem

A motor device of the disclosure includes a motor part including an armature shaft; a speed reduction mechanism which includes a worm and a worm wheel and outputs the rotation of the armature shaft at a reduced speed; a gear case which is provided with a bottom part and an opening part and accommodates the worm and the worm wheel in a rotatable manner; a gear cover which covers the opening part of the gear case; a circuit board which is arranged between the speed reduction mechanism and the gear cover; and a board cover which is arranged between the circuit board and the speed reduction mechanism. The board cover is provided with a positioning protrusion part protruding toward the gear case. The gear case is provided with a positioning recess part into which the positioning protrusion part is press-fit. A bottom surface of the positioning recess part and a tip surface of the positioning protrusion part press-fit into the positioning recess part face each other with a gap therebetween.

According to an aspect of the invention, the positioning protrusion part has a cylinder-shaped main body part and a plurality of collapsed parts protruding from a side surface of the main body part. In addition, when the positioning protrusion part is press-fit into the positioning recess part, at least a portion of the collapsed parts is collapsed by interference with an inner circumferential surface of the positioning recess part.

According to another aspect of the invention, the positioning protrusion part is formed to gradually taper off along a pressing direction toward the positioning recess part, and a maximum outer diameter of the positioning protrusion part is greater than an inner diameter of the positioning recess part.

According to another aspect of the invention, the board cover has a worm cover part intervening between the worm and the circuit board and a wheel cover part intervening between the worm wheel and the circuit board, and the positioning protrusion part is disposed in a vicinity of the worm cover part.

According to another aspect of the invention, a plurality of case side abutment parts abutting against a first main surface of the board cover on which the positioning protrusion is disposed are disposed on the gear case, and a plurality of cover side abutment parts abutting against a second main surface which is on an opposite side of the first main surface of the board cover are disposed on the gear cover. In addition, at least one of the cover side abutment parts is arranged at a position corresponding to the positioning protrusion part.

According to another aspect of the invention, two of the case side abutment parts respectively abutting against a periphery of the first main surface are disposed on the gear case, and four of the cover side abutment parts respectively abutting against a periphery of the second main surface are disposed on the gear cover. In addition, the two case side abutment parts are arranged on an outer side with respect to a quadrangle enclosed by lines connecting the four cover side abutment parts.

According to another aspect of the invention, rigidity of the board cover is lower than rigidity of the gear case.

According to another aspect of the invention, the board cover including the positioning protrusion part is formed of polyacetal.

Inventive Effects

According to the invention, a motor device that positions the board cover accurately without rattles and without concerns that the board cover is damaged is realized.

Figure 7:
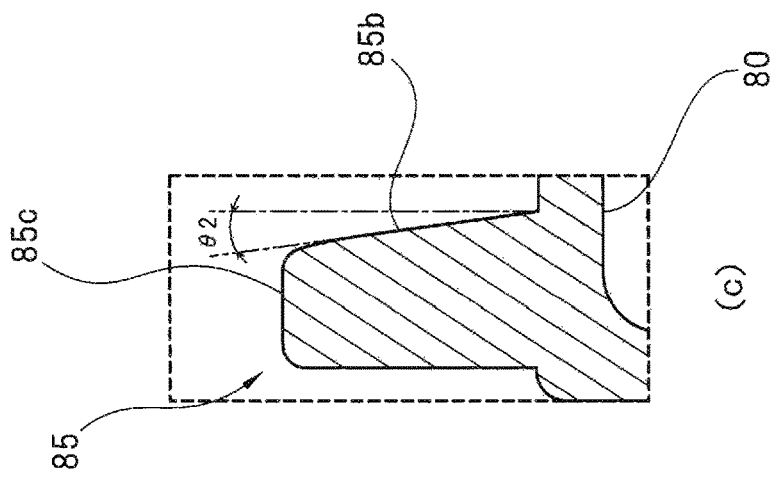
Figure 7:
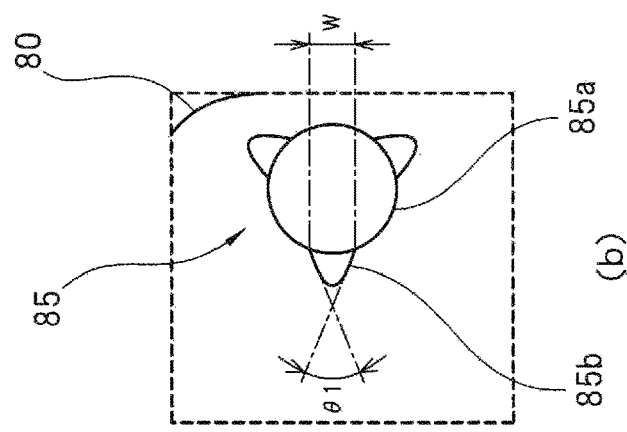
Figure 7:
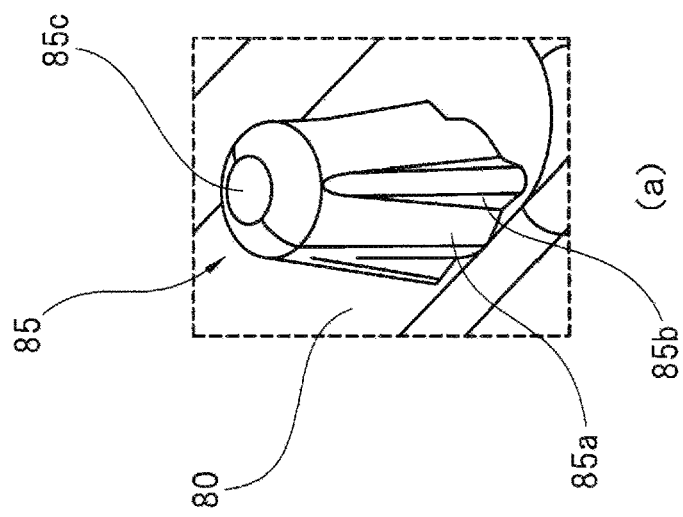

(a) of FIG. 7 is an oblique view illustrating the positioning protrusion part, (b) of FIG. 7 is a plan view thereof, and (c) of FIG. 7 is a cross-sectional view thereof.

Figure 8:
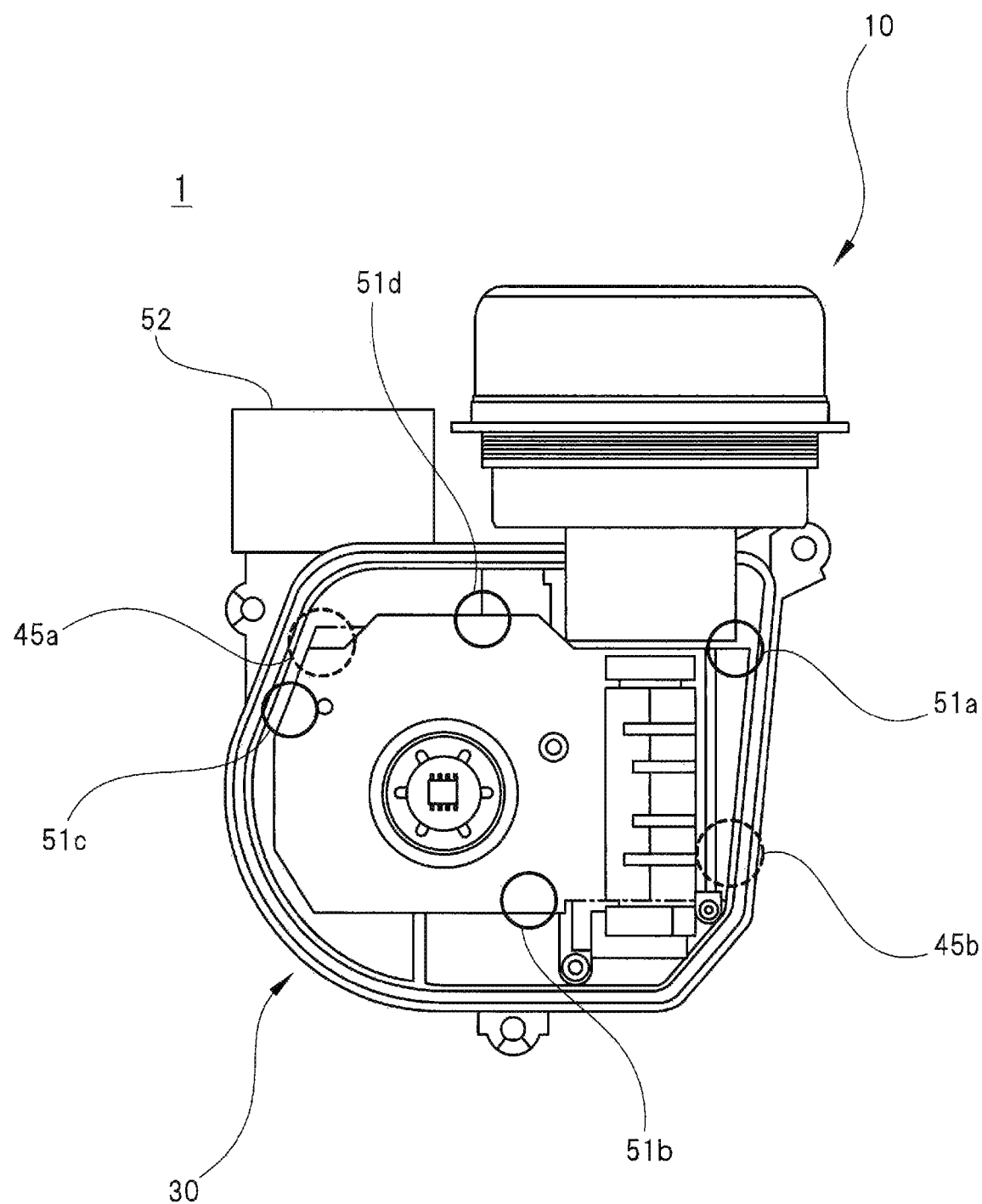

FIG. 8 is a view schematically illustrating an abutment location between an abutment part and the board cover.

DESCRIPTION OF THE EMBODIMENTS

In the following, an example of the embodiment of the invention will be described in detail with reference to the drawings. A motor device according to the embodiment is used as the driving source of a wiper device mounted in a vehicle such as an automobile.

Figure 1:
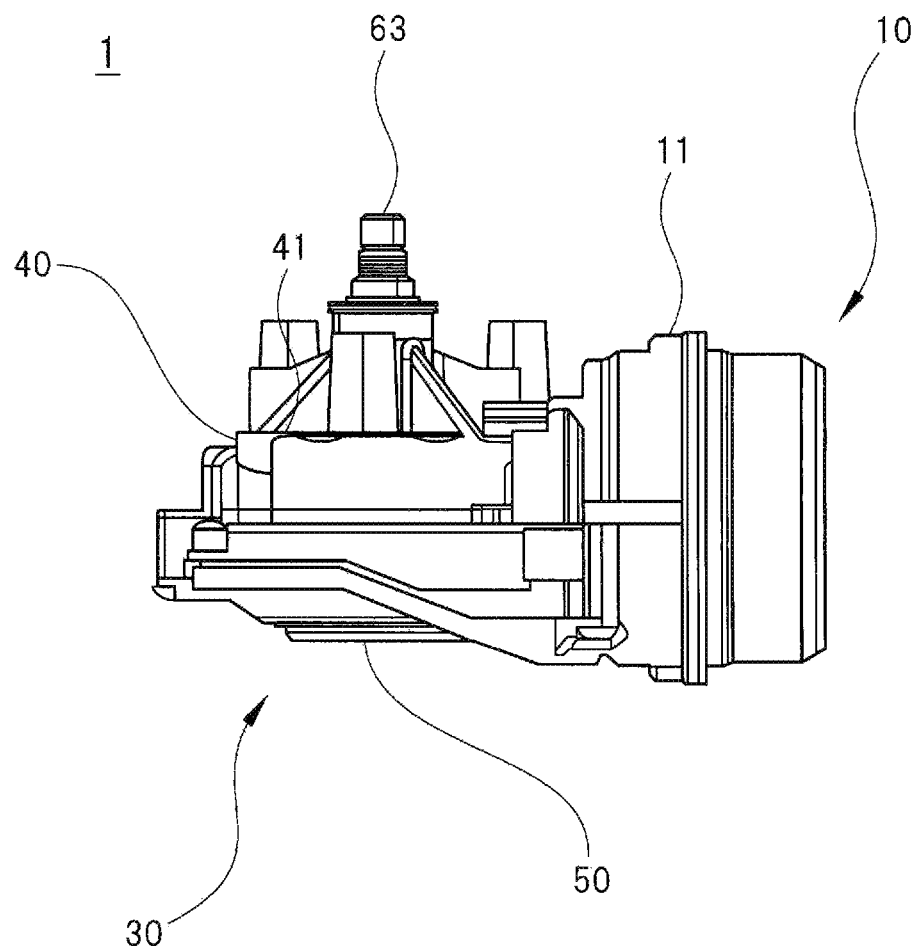
FIG. 1 is a view illustrating an appearance of a motor device.
Figure 2:
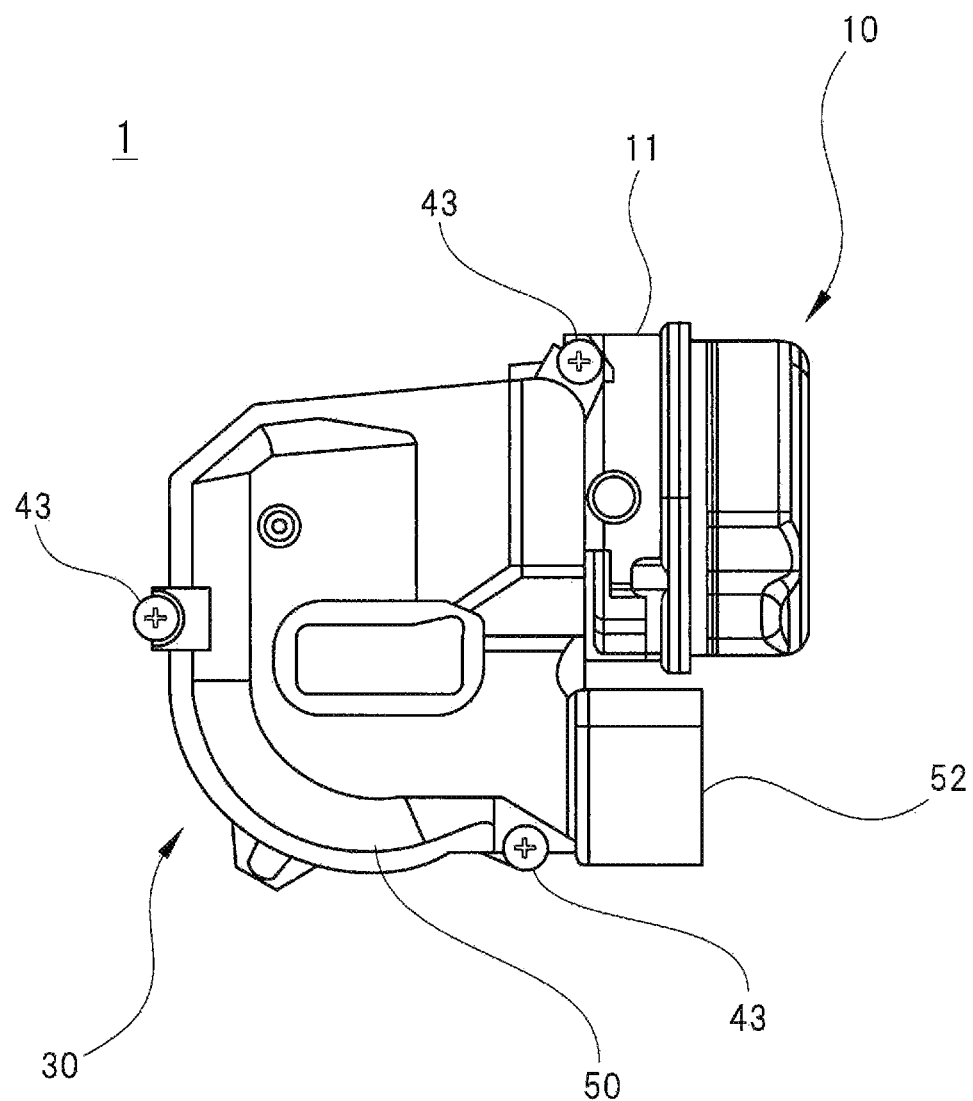
FIG. 2 is another view illustrating the appearance of the motor device.

As shown in FIGS. 1 and 2, a motor device 1 according to the embodiment includes a motor part 10 and a gear part 30. The motor part 10 and the gear part 30 are connected by a plurality of screws and are integrated.

The motor part 10 includes a cylindrical yoke 11. The yoke 11 is formed in a predetermined shape by performing a pressing process on a plate material (a steel plate, etc.) consisting of a magnetic material. A plurality of permanent magnets whose cross-sections are substantially arc-shaped are fixed to the inner side of the yolk 11. An armature around which a coil is wound is rotatably disposed at a predetermined gap on the inner side of the permanent magnets. In addition, an armature shaft 12 (FIG. 4) is disposed on the inner side of the armature. The armature shaft 12 penetrates through the rotational center of the armature and is fixed to the armature. A commutator which a plurality of brushes slidably contact is disposed around the armature shaft 12 and supplies a driving current to the coil of the armature via the brushes and the commutator. Then, a rotational force that rotates the armature occurs, and the armature and the armature shaft 12 fixed to the armature rotate.

As shown in FIG. 1, the gear part 30 includes a gear case 40 and a gear cover 50. In the embodiment, the gear case 40 is made of aluminum and formed by forging, and the gear cover 50 is made of synthetic resin and is formed by injection molding. However, the materials and the manufacturing processes of the gear case 40 or the gear cover 50 are not particularly limited.

Figure 3:
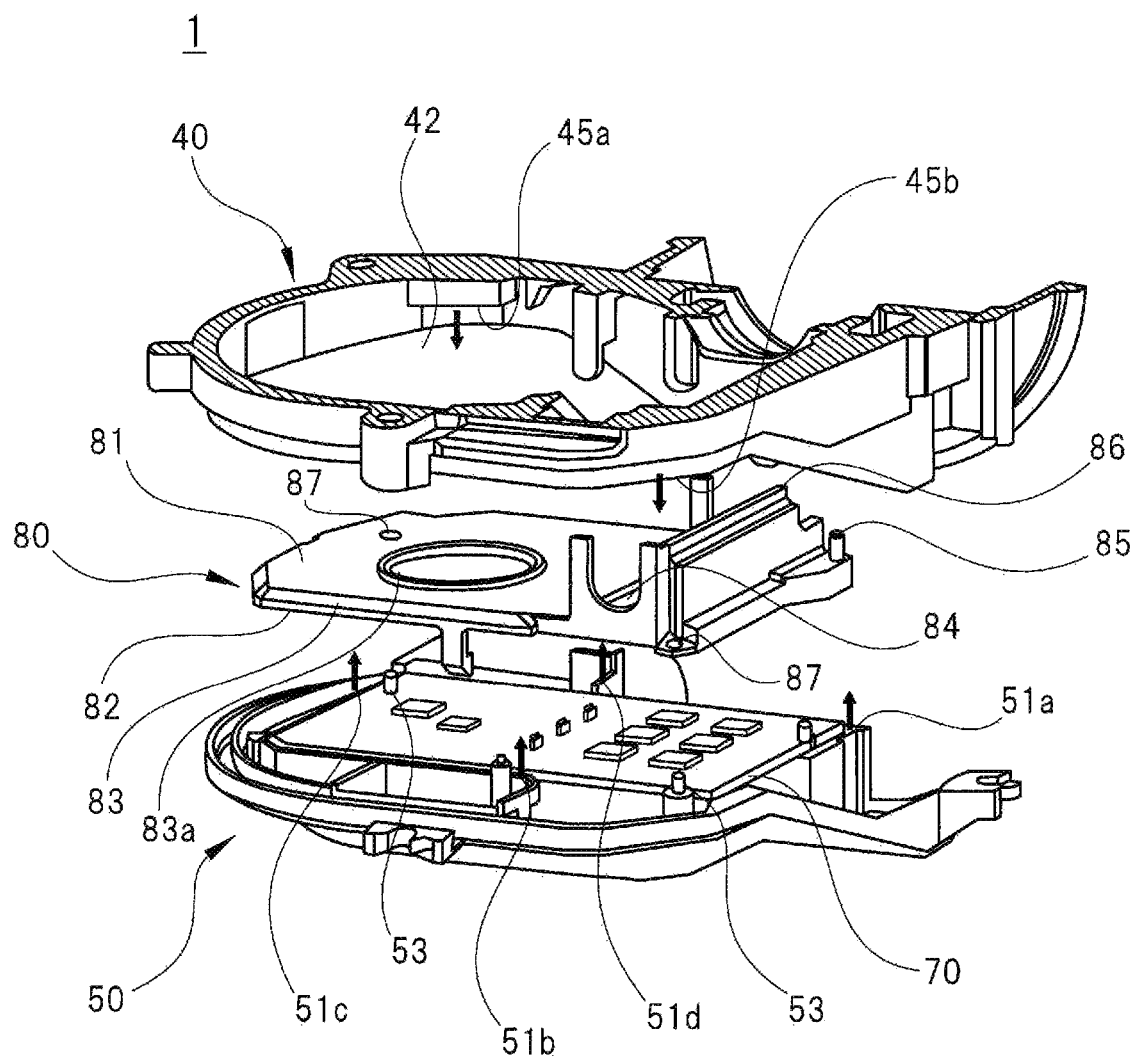
FIG. 3 is a view illustrating an internal structure of the motor device.
Figure 4:
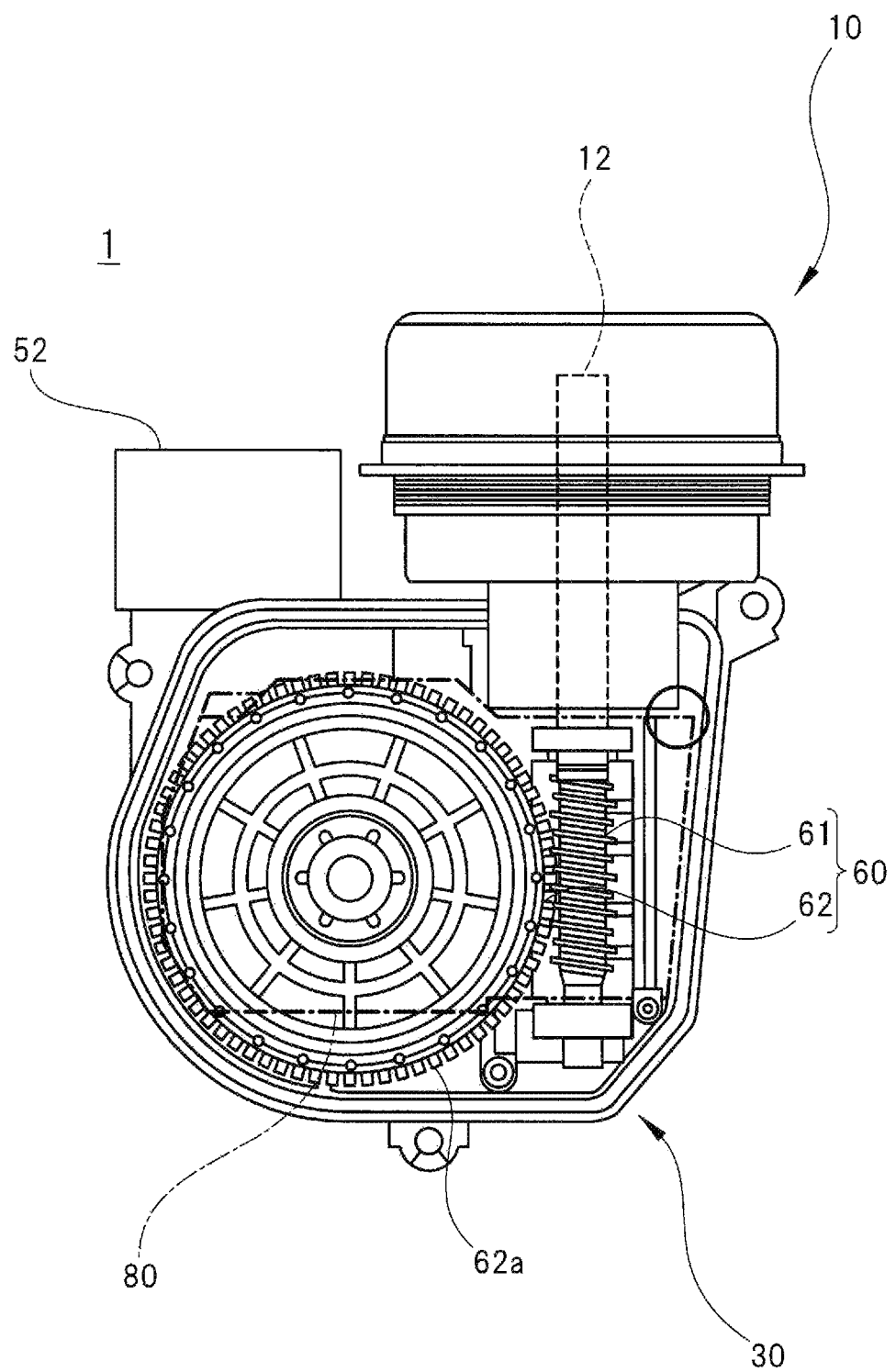
FIG. 4 is a view illustrating a speed reduction mechanism.

As shown in FIGS. 1 and 3, the gear case 40 has a bottom part 41 (FIG. 1) and an opening part 42 (FIG. 3), and the gear cover 50 abuts against the gear case 40 to cover the opening part 42 of the gear case 40 and is fixed to the gear case 40 by a plurality of screws 43 (FIG. 2). As shown in FIG. 4, a worm 61 and a worm wheel 62 forming a speed reduction mechanism 60 is accommodated inside the gear case 40 (FIGS. 1 and 3). The worm 61 is integral with the armature shaft 12 of the motor part 10 and rotates with the rotation of the armature shaft 12. The worm wheel 62 is formed of synthetic resin such as plastics, and is rotatably accommodated inside the gear case 40 (FIGS. 1 and 3). A base end side of an output shaft 63 (FIG. 1) whose tip end side protrudes outside the gear case 40 is fixed to the rotational center of the worm wheel 62. The output shaft 63 is fixed to the gear case 40 with respect to the axis direction by a fixing washer. In addition, the tip end side of the output shaft 63 is combined with a link mechanism of the wiper device.

As shown in FIG. 4, a plurality of gear teeth 62a are formed on the outer circumferential part of the worm wheel 62, and the gear teeth 62 are meshed with the worm 61. As described above, the worm 61 and the worm wheel 62 are the forming elements of the speed reduction mechanism 60, and the speed reduction mechanism 60 reduces the rotational speed of the armature shaft 12 to a predetermined rotational speed to increase the output. The rotational power with increased output is input to the outside (the link mechanism of the wiper device) via the output shaft 63 shown in FIG. 1.

Figure 5:
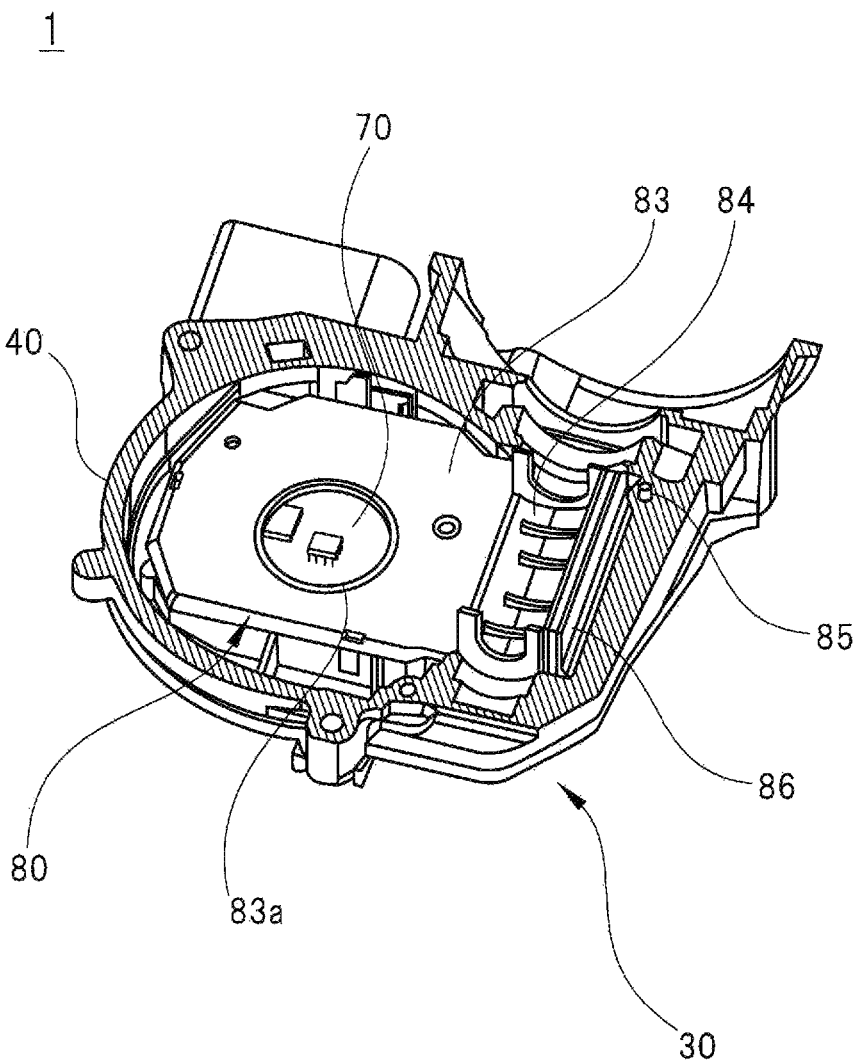
FIG. 5 is a view illustrating an arrangement state of a board cover.

As shown in FIG. 3 and FIG. 5, the circuit board 70 is arranged between the speed reduction mechanism 60 (FIG. 4) and the gear cover 50, and the board cover 80 is arranged between the circuit board 70 and the speed reduction mechanism 60. In other words, the gear cover 50, the circuit board 70, the board cover 80, the speed reduction mechanism 60, and the gear case 40 are arranged in this order. In other words, the board cover 80 intervenes between the speed reduction mechanism 60 and the circuit board 70. In the following descriptions, the two main surfaces of the board cover 80 are distinguished by referring the main surface on the speed reduction mechanism side as a "first main surface 81", and referring to the main surface on the opposite side to the first main surface 81 as a "second main surface 82". In other words, the second main surface 82 of the board cover 80 is the main surface on the circuit board side. Nevertheless, such distinction is merely for the convenience of description.

As shown in FIG. 3, the entire circuit board 70 has a substantially rectangular shape, and a control circuit, a sensor, etc., are mounted thereon. For example, on the circuit board 70, a control circuit formed by various electronic parts such as a capacitor, a choke coil, a CPU, etc., is mounted on the circuit board 70. In addition, on the circuit board 70, a magnetic sensor, such as a Hall IC, that detects magnetic pole changes due to passing of a magnet installed to the worm wheel 62 or the armature shaft 12 is mounted. The control circuit supplies the driving current to the brushes based on the detection result of the magnetic sensor, and controls the rotational direction, rotational speed, etc., of the armature shaft 12 (FIG. 4). In the embodiment, the magnetic sensor is mounted on a surface (front surface) of the circuit board 70 facing the board cover 80, and various electronic components are mounted on the other surface (back surface) of the circuit board 70 facing the gear cover 50. That is, the surface of the circuit board 70 on which the magnetic sensor is mounted faces the second surface 82 of the board cover 80. A connector connection part 52 (FIG. 2) connected with an external connector is provided on the gear cover 50. In addition to the detection signal output from the magnetic sensor, a signal input via the connector with which the connector connection part 52 is connected is also input to the control circuit.

As shown in FIGS. 3 and 5, the board cover 80 is formed of synthetic resin such as plastics (polyacetal in the embodiment) and the rigidity thereof is lower than the rigidity of the gear case 40. The board cover 80 has a wheel cover part 83 whose cross-section is in a substantially flat shape and a worm cover part 84 whose cross-section is in a substantially semi-circular shape. The wheel cover part 83 mainly intervenes between the worm wheel 62 (FIG. 4) and the circuit board 70, and the worm cover part 84 mainly intervenes between the worm 61 (FIG. 4) and the circuit board 70. In other words, in the board cover 80 intervening between the speed reduction mechanism 60 (FIG. 4) and the circuit board 70, the portion (region) mainly positioned between worm wheel 62 and the circuit board 70 is the wheel cover part 83, and the portion (region) mainly positioned between the worm 61 and the circuit board 70 is the worm cover part 84. Nevertheless, the wheel cover part 83 and the worm cover part 84 are integrally formed of synthetic resin (polyacetal in the embodiment).

On the wheel cover part 83 of the board cover 80, a circular opening part 83*a* exposing the magnet installed to the worm wheel 62 (FIG. 4) is formed. Accordingly, even though the board cover 80 intervenes between the circuit board 70 and the worm wheel 62, the magnetic pole changes due to passing of the magnet installed to the worm wheel 62 can be reliably detected by the magnetic sensor mounted on the circuit board 70.

According to the above, the circuit board 70 is covered by the board cover 80 intervening between the circuit board 70 and the speed reduction mechanism 60. Accordingly, even if the grease coated on the speed reduction mechanism 60 (particularly the portion where the worm 61 and the worm wheel 62 are meshed) scatters as the worm 61 or the worm wheel 62 rotates, the grease does not attach to the circuit board 70, and there is no concern of malfunctioning such as erroneous operation of the control circuit mounted on the circuit board 70 or detection failure of the magnetic sensor.

Figure 6:
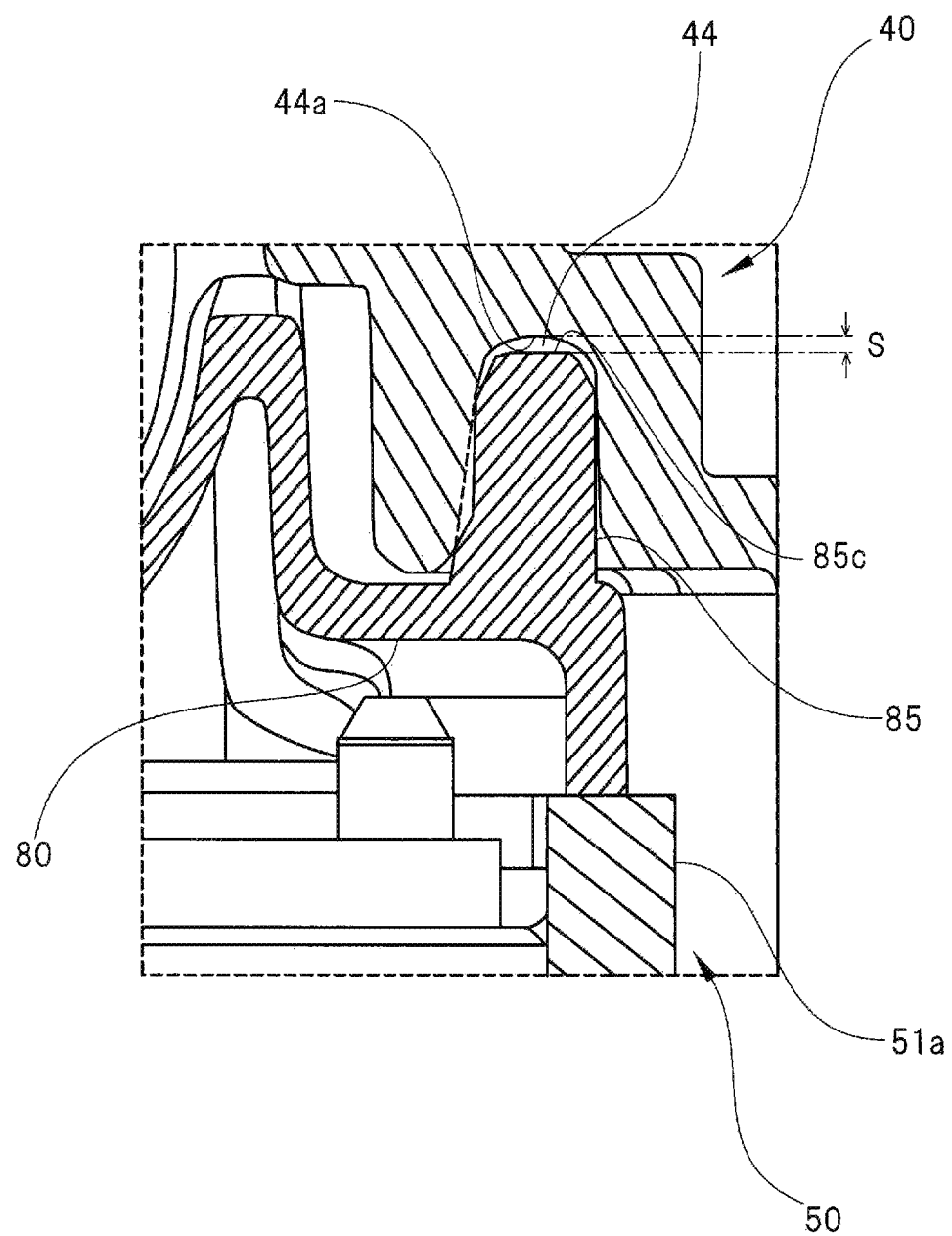
FIG. 6 is a view illustrating a positioning protrusion part and a positioning recess part.

As shown in FIG. 3, a positioning protrusion part 85 protruding toward the gear case 40 is disposed at a corner of the first main surface 81 of the board cover 80. Meanwhile, as shown in FIG. 6, a positioning recess part 44 is disposed on the gear case 40. As shown in FIG. 3, the positioning protrusion part 85 is positioned in a vicinity of the worm cover part 84 of the board cover 80. As shown in FIGS. 3 and 5, on a side of the worm cover part 84, a side wall 86 along the worm cover part 84 is integrally formed, and the positioning protrusion part 85 is integrally formed in a vicinity of the outer side of the side wall 86. In addition, the positioning protrusion part 85 is arranged on a side opposite to a side on which the worm wheel 62 is disposed to sandwich the worm cover part 84. Accordingly, compared with the case where the positioning protrusion part 85 is arranged in a narrow space where the worm wheel 62 is disposed, the layout of the positioning protrusion part 85 or the speed reduction mechanism 60 has a greater degree of freedom. In addition, the grease can be prevented from entering the positioning recess part 44.

As shown in FIG. 6, the positioning protrusion part 85 disposed on the board cover 80 is press-fit into the positioning recess part 44 disposed on the gear case 40. In other words, the positioning protrusion part 85 disposed on the board cover 80 is press-fit into the positioning recess part 44 disposed on the gear case 40 where the speed reduction 60 (FIG. 4) is incorporated. That is, by press-fitting the positioning protrusion part 85 into the positioning recess part 44, the board cover 80 is accurately positioned with respect to the speed reduction mechanism 60 incorporated into the gear case 40. Accordingly, the interference of the speed reduction mechanism 60 can be avoided, the clearance between the speed reduction mechanism and the board cover 80 can be reduced as much as possible, the scattering of the grease can be effectively avoided, and the motor device 1 can be miniaturized. In addition, in the embodiment in which the positioning protrusion part 85 is disposed in a vicinity of the worm cover part 84, since the board cover 80 is accurately positioned with respect to the worm 61 whose operation is intense among the forming elements of the speed reduction mechanism 60, the rattles of the board cover 80 is suppressed even if the worm 61 operates intensively.

As shown in (a) to (c) of FIG. 7, the positioning protrusion part 85 has a cylinder-shaped main body part 85*a* and three collapsed parts 85*b* protruding from the side surface of the main body part 85*a*. As shown in (b) of FIG. 7, the three collapsed parts 85*b* are disposed on the outer circumferential surface of the main body part 85*b* at equal intervals (intervals of 120 degrees). The respective collapsed parts 85*b* are presented in a shape of a substantial isosceles triangle on a cross-section perpendicular to the axis of the main body part 85*a*. In addition, as shown in (a) of FIG. 7, each of the collapsed parts 85*b* has a taper shape in which the amount of protrusion with respect to the main body part 85*a* gradually decreases from the base end of the collapsed part 85*b* toward the tip end thereof. A width W of the collapsed part 85*b* shown in (b) of FIG. 7 is the maximum width of the collapsed part 85*b*, and the value thereof is 0.7 mm. In addition, the apex angle ($\theta 1$) shown in the same figure is 45°. The taper angle ($\theta 2$) of the collapsed part 85*b* shown in (c) of FIG. 7 is 8°.

As can be understood from FIGS. 7(*a*) to 7(*c*), the amount of protrusion of the collapsed part 85*b* with respect to the main body part 85*a* is at maximum at the base end of the collapsed part 85*b* and at minimum at the tip end. As a result, the positioning protrusion part 85 including the collapsed parts 85*b* gradually tapers off along the pressing direction toward the positioning recess part 44 (FIG. 6), and the outer diameter of the positioning protrusion part 85 is at maximum at the base end thereof and at minimum at the tip end. The maximum outer diameter of the positioning protrusion part 85*b* (the outer diameter of the base end of the positioning protrusion part 85) is greater than the inner diameter of the positioning recess part 44. Accordingly, the positioning protrusion part 85 is not completely press-fit into the positioning recess part 44. Specifically, as shown in FIG. 6, a tip end surface 85*c* of the positioning protrusion part 85 press-fit into the positioning recess part 44 does not reach a bottom surface 44*a* of the positioning recess part 44. The tip end surface 85*c* of the positioning protrusion part 85 and the bottom surface 44*a* of the positioning recess part 44 face each other with a gap (S) therebetween. In this way, by preventing the positioning protrusion part 85 from abutting against (touching the bottom of) the positioning recess part 44, the sealing property between the gear case 40 and the gear cover 50 is ensured.

In addition, the board cover 80 including the positioning protrusion part 85 is formed of synthetic resin such as plastics, and the rigidity thereof is lower than the rigidity of the gear case 40. Accordingly, when the positioning protrusion part 85 is press-fit into the positioning recess part 44, at least a portion of the three collapsed parts 85*b* disposed on the positioning protrusion part 85 is collapsed by the interference with the inner circumferential surface of the positioning recess part 44. As a result, the collapsed parts 85b and the positioning recess part 44 form an abutment surface on which the gear case 40 and the gear cover 50 abut against each other in opposing directions, and the positioning of the gear case 40 and the gear cover 50 in the opposing directions is further ensured. In addition, the collapsed parts 85b and the positioning recess part 44 are in close contact with each other, and the force for regulating the rotation about the positioning protrusion part 85 as the axis center becomes stronger. Moreover, since the collapsed amount of the collapsed part 85b can be adjusted by the position at which the gear case 40 and the gear cover 50 are assembled, by absorbing the size errors of the board cover 80, the gear case 40, the gear cover 50, etc., the damages of the board cover 80, the gear case 40, the gear cover 50, etc., caused by excessive press-fitting can be prevented.

As shown in FIG. 3, a plurality of case side abutment parts abutting against the periphery of the first main surface 81 of the board cover 80 are disposed on the gear case 40, and a plurality of cover side abutment part abutting against the periphery of the second main surface 82 of the board cover 80 are disposed on the gear cover 50. In the embodiment, two case side abutment parts 45a and 45b are disposed on the gear case 40, and four cover side abutment parts 51a, 51b, 51c, and 51d are disposed on the gear cover 50. In addition, the cover side abutment part 51a is arranged at a position corresponding to the positioning protrusion part 85 of the board cover 80. Specifically, at the time when the gear case 40 abuts against the gear cover 50 with the board cover 80 sandwiched 80 therebetween, the cover side abutment part 51a is disposed at a position facing the positioning recess part 44 or a position arranged in a vicinity thereof (see FIG. 6) with the positioning protrusion part 85 being sandwiched therebetween. Accordingly, the collapsed part 85b of the positioning protrusion part 85 abuts against both the gear case 40 and the gear cover 50, and can position the gear case 40 and the gear cover 50 in the facing directions. In addition, two rotation suppression pins 53 are disposed on the gear cover 50. By inserting the rotation suppression pins 53 into two through holes 87 disposed on the board cover 80, the rotation of the board cover 80 with respect to the gear cover 50 is suppressed.

FIG. 8 schematically shows the abutment location between each abutment part including the cover side abutment part 51a and the circuit board 70. The two circles shown in broken lines indicate the abutment locations between the case side abutment parts 45a and 45b and the circuit board 70. In addition, the four circles shown in solid lines indicate the abutment locations between the cover side abutment parts 51a, 51b, 51c, and 51d and the circuit board 70. As shown in FIG. 8, the respective abutment parts (the case side abutment parts 45a and 45b and the cover side abutment parts 51a, 51b, 51c, and 51d) respectively abut against different positions on the periphery of the circuit board 70. In addition, the case side abutment parts 45a and 45b are arranged on an outer side with respect to a quadrangle enclosed by lines connecting the cover side abutment parts 51a, 51b, 51c, and 51d. By disposing the abutment parts abutting against the board cover 80 on the gear case 40 as well as the gear cover 50, a well-balanced pressure is applied to the board cover 80 and the board cover 80 is held without tilting.

According to the above, the board cover 80 in the embodiment is positioned and fixed through being sandwiched by the gear case 40 and the gear cover 50, and is also positioned and fixed by press-fitting the positioning protrusion part disposed thereon into the positioning recess part 44 disposed on the gear case 40. Accordingly, the board cover 80 does not receive an excessive pressure or an unbalanced pressure, and can be accurately positioned and fixed.

The invention is not limited to the above embodiments, and can be modified in various way without departing from the gist thereof. In addition, the sizes, numbers, numerical values, and the like described in this specification are all merely examples. In particular, the sizes, shapes, etc., of the positioning protrusion part 85 shown in FIGS. 7(a) to 7(c) are all merely examples. The sizes, shapes, numbers, arrangements, etc., of the positioning protrusion part 85 can be appropriately changed as necessary. In addition, the material of the board cover 80 including the positioning protrusion part 85 is not limited to polyacetal. However, when the positioning protrusion part 85 is press-fit into the positioning recess part 44, it is preferable that the collapsed parts 85b disposed on the positioning protrusion part 85 is collapsed while extending and spreading out without burrs. From this viewpoint, polyacetal having high viscosity is suitable as the material of the board cover 80.

The invention can be widely applied not only to a motor device as the driving source of a wiper device but also to motor devices used as driving sources of various devices.

INDUSTRIAL APPLICABILITY

The motor device can be used as a driving source of a wiper device mounted in a vehicle such as an automobile.

What is claimed is:
1. A motor device, comprising:
a motor part comprising an armature shaft;
a speed reduction mechanism which comprises a worm and a worm wheel and outputs rotation of the armature shaft at a reduced speed;
a gear case which, is provided with a bottom part and an opening part and accommodates the worm and the worm wheel in a rotatable manner;
a gear cover which covers the opening part of the gear case;
a circuit board which is arranged between the speed reduction mechanism and the gear cover; and
a board cover which is arranged between the circuit board and the speed reduction mechanism,
wherein the board cover is provided with a positioning protrusion part protruding toward the gear case, the gear case is provided with a positioning recess part into which the positioning protrusion part is press-fit, and a bottom surface of the positioning recess part and a tip end surface of the positioning protrusion part press-fit into the positioning recess part face each other with a gap between the tip end surface of the positioning protrusion part and the bottom surface of the positioning recess part as the gap prevents the positioning protrusion part from touching any of the positioning recess part,
wherein a plurality of case side abutment parts abutting against a first main surface of the board cover on which the positioning protrusion is disposed are disposed on the gear case and being a part of the gear case, a plurality of cover side abutment parts abutting against a second main surface which is on an opposite side of the first main surface of the board cover are disposed on the gear cover and being a part of the gear cover, and at least one of the cover side abutment parts is arranged at a position corresponding to the positioning protrusion part, wherein the at least one of the cover side abutment parts is aligned with at least a part of the positioning recess part with the positioning protrusion part sandwiched between the at least one of the cover side abutment parts and the positioning recess part.

2. The motor device as claimed in claim 1, wherein the positioning protrusion part has a cylinder-shaped main body part and a plurality of collapsed parts protruding from a side surface of the main body part, and when the positioning protrusion part is press-fit into the positioning recess part, at least a portion of the collapsed parts is collapsed by interference with an inner circumferential surface of the positioning recess part.

3. The motor device as claimed in claim 2, wherein the positioning protrusion part is formed to gradually taper off along a pressing direction toward the positioning recess part, and a maximum outer diameter of the positioning protrusion part is greater than an inner diameter of the positioning recess part.

4. The motor device as claimed in claim 1, wherein the board cover has a worm cover part intervening between the worm and the circuit board and a wheel cover part intervening between the worm wheel and the circuit board, and the positioning protrusion part is disposed in a vicinity of the worm cover part.

5. The motor device as claimed in claim 1, wherein two of the case side abutment parts respectively abutting against a periphery of the first main surface are disposed on the gear case, four of the cover side abutment parts respectively abutting against a periphery of the second main surface are disposed on the gear cover, and the two case side abutment parts are arranged on an outer side with respect to a quadrangle enclosed by lines connecting the four cover side abutment parts.

6. The motor device as claimed in claim 1, wherein rigidity of the board cover is lower than rigidity of the gear case.

7. The motor device as claimed in claim 6, wherein the board cover comprising the positioning protrusion part is formed of polyacetal.

8. The motor device of claim 1, wherein the positioning protrusion part is orthogonal to the first main surface and when the first main surface is in a horizontal direction, the positioning protrusion part is vertically aligned to the at least one of the cover side abutment parts.

* * * * *